(12) United States Patent  (10) Patent No.: US 8,717,479 B2
Mori  (45) Date of Patent: May 6, 2014

(54) IMAGING APPARATUS, SHOOTING ASSISTANCE SYSTEM, IMAGING APPARATUS CONTROL METHOD, AND METHOD FOR EVALUATING INDIVIDUALS IN AN IMAGE

(75) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 13/179,449

(22) Filed: Jul. 8, 2011

(65) Prior Publication Data
US 2012/0013782 A1  Jan. 19, 2012

(30) Foreign Application Priority Data

Jul. 13, 2010 (JP) .................................. 2010-159008

(51) Int. Cl.
*H04N 5/232* (2006.01)
(52) U.S. Cl.
USPC ..................................................... 348/333.02
(58) Field of Classification Search
USPC .............................. 348/333.02; 396/281–296
See application file for complete search history.

(56) References Cited

U.S. PATENT DOCUMENTS

| 7,787,665 | B2 | 8/2010 | Nakashima |
| 2007/0019083 | A1* | 1/2007 | Nakashima ................... 348/239 |
| 2007/0147826 | A1 | 6/2007 | Matsuzaki |
| 2008/0199056 | A1 | 8/2008 | Tokuse |
| 2009/0040324 | A1* | 2/2009 | Nonaka ....................... 348/220.1 |

FOREIGN PATENT DOCUMENTS

| CN | 1901672 A | 1/2007 |
| CN | 101313565 A | 11/2008 |
| JP | 2007-020104 A | 1/2007 |
| JP | 2008-244903 A | 10/2008 |
| JP | 2008-289130 A | 11/2008 |
| JP | 2009-055448 A | 3/2009 |
| JP | 2010-118787 A | 5/2010 |

* cited by examiner

*Primary Examiner* — Twyler Haskins
*Assistant Examiner* — Angel L Garces-Rivera
(74) *Attorney, Agent, or Firm* — Canon U.S.A., Inc., IP Division

(57) ABSTRACT

An imaging apparatus for shooting images includes an acquisition unit configured to acquire information about an evaluation of an identified individual in at least one shot image based on a composition of the image, and a presentation unit configured to present the information corresponding to the identified individual, wherein the information is used to support shooting of the images.

18 Claims, 13 Drawing Sheets

FIG.6A

| NUMBER OF OBJECTS | IMAGING POSITION | NUMBER OF POINTS |
|---|---|---|
| 3 PERSONS | CENTER POSITION | 4 POINTS |
| | BOTH-END POSITION | 2 POINTS |
| 2 PERSONS | RIGHT POSITION | 3 POINTS |
| | LEFT POSITION | |
| 1 PERSON | CENTER | 5 POINTS |
| | OTHER THAN CENTER | 4 POINTS |

609    610    611

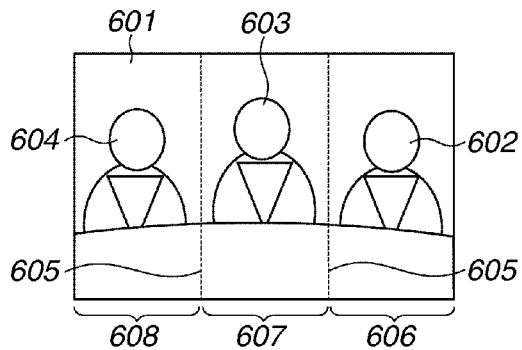

| NUMBER OF OBJECTS | FACE SIZE | NUMBER OF POINTS |
|---|---|---|
| 3 PERSONS | LARGE | 4 POINTS |
| | MIDDLE | 3 POINTS |
| | SMALL | 2 POINTS |
| 2 PERSONS | LARGE | 5 POINTS |
| | MIDDLE | 4 POINTS |
| | SMALL | 3 POINTS |
| 1 PERSON | LARGE | 6 POINTS |
| | MIDDLE | 5 POINTS |
| | SMALL | 4 POINTS |

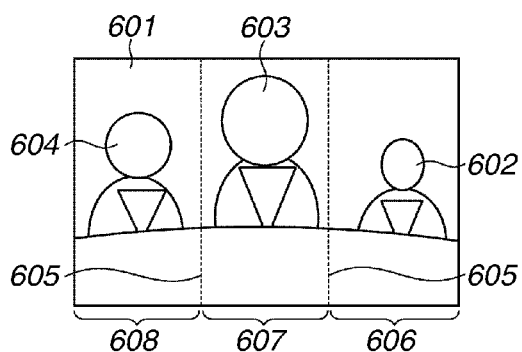

FIG.6D

FIG.7A
| COUNT POINT NUMBER | PRESENTATION METHOD |
|---|---|
| 0 TO 3 POINTS | HIGHLIGHTED DISPLAY |
| 4 TO 9 POINTS | NORMAL DISPLAY |
| 10 POINTS OR MORE | WEAK DISPLAY |
701 702
FIG.7B
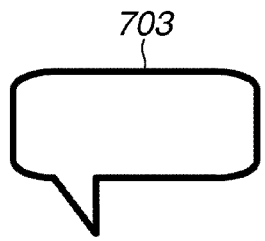
703
FIG.7C
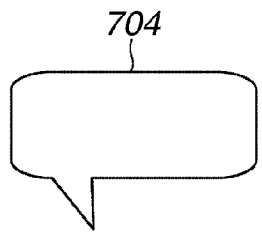
704
FIG.7D
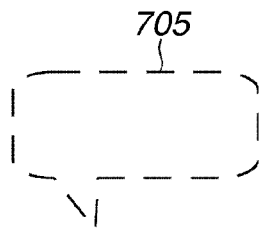
705

FIG.12A

| IDENTIFICATION CODE | | IMAGE ID | No. 001 | No. 002 | No. 003 |
|---|---|---|---|---|---|
| A | | NUMBER OF OBJECTS | 2 | 1 | 2 |
| | | POSITION | (xa1, ya1) | (xa2, ya2) | (xa3, ya3) |
| | | SIZE | (Xa1, Xa1) | (Xa2, Xa2) | (Xa3, Xa3) |
| B | | NUMBER OF OBJECTS | 2 | | |
| | | POSITION | (xb2, yb2) | | |
| | | SIZE | (Xb2, Yb2) | | |
| C | | NUMBER OF OBJECTS | | | 2 |
| | | POSITION | | | (xc3, yc3) |
| | | SIZE | | | (Xc3, Yc3) |

FIG.12B

| IMAGE ID | IMAGING ENVIRONMENT |
|---|---|
| No. 001 | GROUP PHOTOGRAPH |
| No. 002 | LANDSCAPE |
| No. 003 | PERSON |

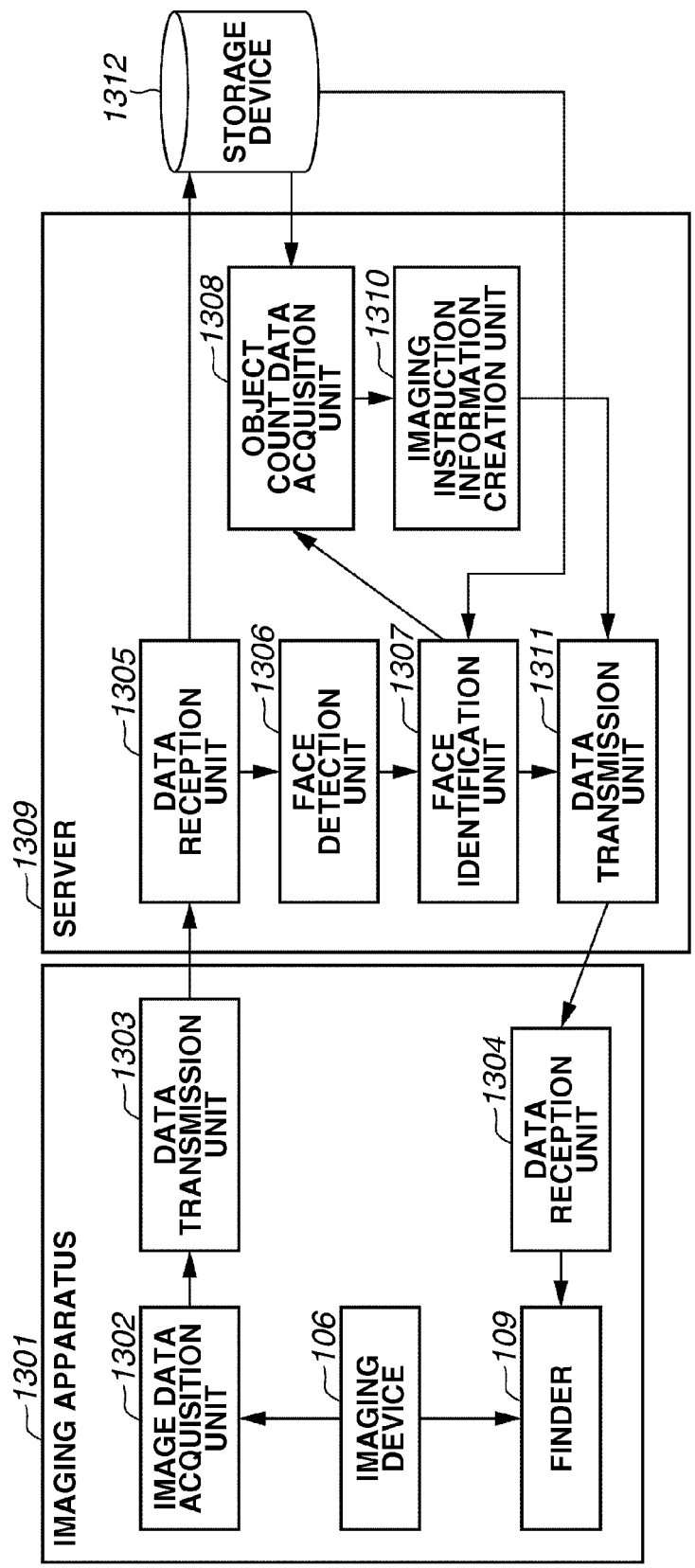

ing photographer. Especially, recently album creation services have become widespread, and thus the opportunities to create an album are increasing. Further, when creating an album, it is often required that the photographs are selected so that the plurality of participants, which serve as "objects", appear evenly. Alternatively, when as album is to be used as a gift, for example, the photographs may be selected so that a specific participant appears more often.
IMAGING APPARATUS, SHOOTING ASSISTANCE SYSTEM, IMAGING APPARATUS CONTROL METHOD, AND METHOD FOR EVALUATING INDIVIDUALS IN AN IMAGE

BACKGROUND OF THE INVENTION

1. Field of the Invention

The present invention relates to a technique for assisting photography, and in particular, relates to an imaging apparatus and a shooting assistance system suitable for an album creation application.

2. Description of the Related Art

When people participate in group travel and various events, or take a trip to an amusement park, an album is often created that not only uses photographs taken by the individual participants, but also uses photographs taken by an accompanying photographer. Especially, recently album creation services have become widespread, and thus the opportunities to create an album are increasing. Further, when creating an album, it is often required that the photographs are selected so that the plurality of participants, which serve as "objects", appear evenly. Alternatively, when as album is to be used as a gift, for example, the photographs may be selected so that a specific participant appears more often.

To improve the efficiency of such an album creation operation, the following techniques are known. For example, U.S. Pat. No. 7,787,665 discusses a technique for identifying people in an image captured by an imaging apparatus before imaging, counting shot image number information for each person, and issuing a warning about a bias in the number of shot images. Further, the shot image number is managed by setting an object who is shown in predetermined positions, such as an in-focus position or a position near the center of the shot images as a main object.

However, in the imaging apparatus discussed in U.S. Pat. No. 7,787,665, one person per shot is managed as the main object. No consideration is given regarding the position information of the other objects appearing in a photographed image. Thus, there is room for improvement in terms of shooting support that takes object composition into account. More specifically, when an album is created using photographed images, there is an issue that since the number of the main objects in each photographed image is counted but the number of the other objects therein is not counted, the number of the photographed images may differ among the objects as a result.

SUMMARY OF THE INVENTION

The present invention is directed to shooting support to reduce compositional bias.

According to an aspect of the present invention, an imaging apparatus for shooting images includes an acquisition unit configured to acquire information about an evaluation of an identified individual in at least one shot image based on a composition of the image, and a presentation unit configured to present the information corresponding to the identified individual, wherein the information is used to support shooting of the images.

According to another aspect of the present invention, a shooting support system for supporting shooting of images includes an evaluation unit configured to evaluate an individual identified in a shot image based on a composition of the image, a counting unit configured to count a plurality of evaluations made by the evaluation unit for each individual, and a presentation unit configured to present shooting support information to a user based on information obtained by the counting corresponding to the individual shot by the user with an imaging apparatus.

According to yet another aspect of the present invention, a method for controlling an imaging apparatus for shooting images includes acquiring information about an evaluation of an identified individual in at least one shot image, and presenting the information corresponding to the identified individual.

According to still yet another aspect of the present invention, a method for evaluating an individual in an image with an information processing apparatus includes detecting and identifying the individual in the image, evaluating the identified individual based on a composition of the image, and counting the evaluations in a plurality of images for each identified individual.

According to the present invention, shooting can be performed with little compositional bias by having the user confirm presented shooting support information. Therefore, an album with little bias in the object appearance number and little compositional bias can be easily created.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6D illustrate an example of a point table based on composition information and an example of calculating the shooting support information according to each exemplary embodiment.

FIGS. 7A to 7D illustrate a method for presenting shooting support information according to each exemplary embodiment.

FIGS. 12A and 12B illustrate examples of object count data according to each exemplary embodiment.

FIG. 13 is a block diagram illustrating a configuration of a shooting assistance system according to a fourth exemplary embodiment.

DESCRIPTION OF THE EMBODIMENTS

Various exemplary embodiments, features, and aspects of the invention will be described in detail below with reference to the drawings.

Figure 1:
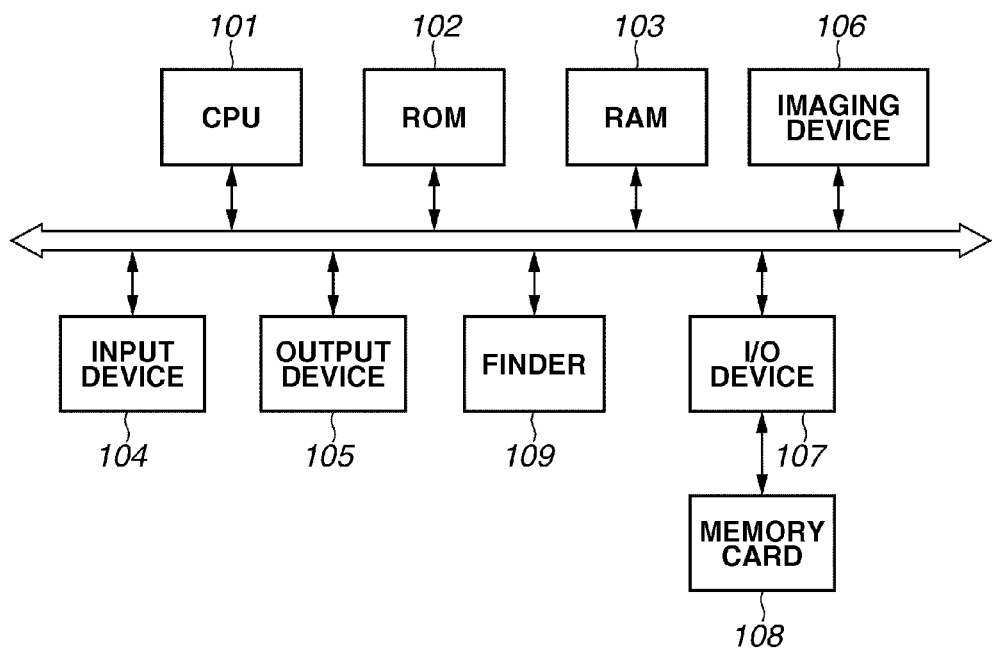
FIG. 1 is a block diagram illustrating a configuration of an imaging apparatus according to a first exemplary embodiment.

In a first exemplary embodiment, an imaging apparatus presents shooting support information for each object on an object image displayed on a display device. In the present exemplary embodiment, the shooting support information is displayed on the imaging apparatus based on the number of shot images for each object and composition information obtained by analyzing the object as a count target. FIG. 1 is a block diagram illustrating a composition of an imaging apparatus realizing the present exemplary embodiment.

A central processing unit (CPU) 101 is a calculation device that performs calculations and logic determinations for various processes and controls the respective constituent elements connected to a bus 110. Further, the CPU 101 performs controls such as the below-described imaging processing, shooting support information presentation processing, and object count data acquisition processing based on control programs stored in a memory. A read-only memory (ROM) 102 stores the control programs executed by the CPU 101, and operates as a program memory. Further, the ROM 102 also stores a below-described point table. A random access memory (RAM) 103 is used as a work memory for the CPU 101. Further, the RAM 103 loads programs from an external storage device, and can also operate as a program memory.

An input device 104 corresponds to, for example, various buttons, such as a shutter button, a mouse, a keyboard, or a touch panel device mounted on the imaging apparatus. The imaging conditions of the imaging apparatus can be set and various pieces of information can be input by a user operating the input device 104. Further, imaging processing can be started by generating a signal to interrupt a program being executed by an operation of the shutter button included in the input device 104.

An output device 105 is, for example, a display unit such as a liquid crystal panel for displaying image data output by the CPU 101. The output device 105 displays the various set modes or other imaging information, and also displays a photographed image. An imaging device 106 is configured to include an image sensor that receives object light incident via a photographic lens, converts the received light into an imaging signal, and outputs the imaging signal, and an analog-to-digital (A/D) conversion unit that converts the imaging signal output from the image sensor into image data and outputs the image data.

An input/output (I/O) device 107 operates as an input/output interface with external devices. For example, the I/O device 107 may be an interface unit that includes an external memory input/output device that reads and writes data from/to an external memory such as a memory card based on control from the CPU 101, an input/output unit such as a universal serial bus (USB) cable, and a wireless signal transmission/reception unit. A memory card 108 is a removable storage device that is controlled by the I/O device 107. The memory card 108 stores images and other data acquired by the imaging apparatus.

A finder 109 is a display unit for object image confirmation, and is configured to include a screen and an in-finder display device arranged on the screen. The screen is configured so that object light incident via the photographic lens of the imaging device 106 is projected thereon, and the object image is displayed. Further, the in-finder display device can display various information pieces on the object image by superimposing them on the image on the screen. The below-described shooting support information is also displayed on the in-finder display device. The photographer can confirm the object image displayed by the screen and the in-finder display device via an optical system.

The imaging apparatus will be described in more detail using FIG. 4, which schematically illustrates the imaging apparatus according to the present exemplary embodiment.

Figure 4:
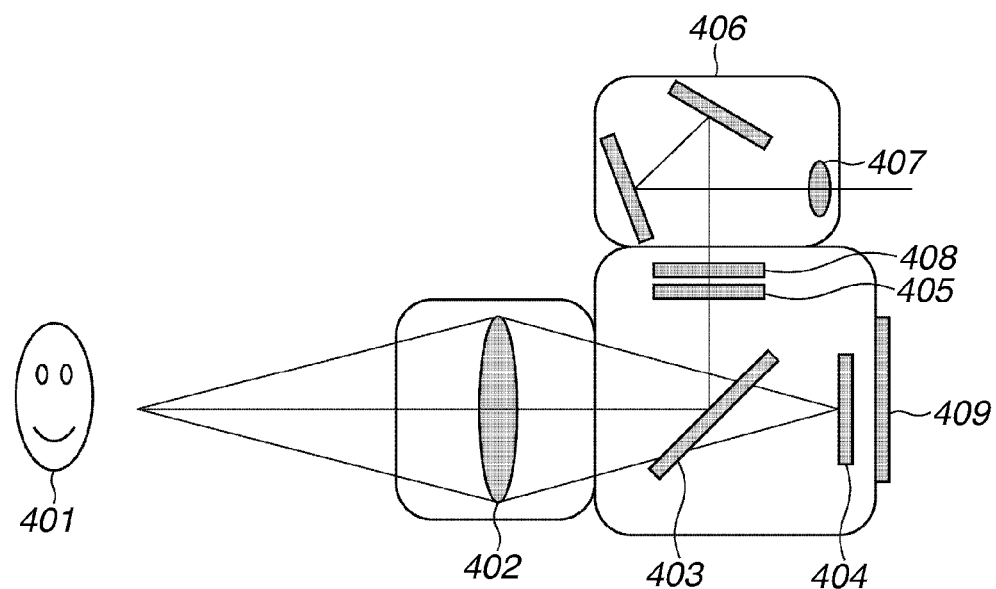
FIG. 4 schematically illustrates an imaging apparatus according to the first exemplary embodiment.

The diagram illustrated in FIG. 4 includes an object 401 of the imaging apparatus. The imaging apparatus includes a photographic lens apparatus 402 that can be removed from the imaging apparatus. A half mirror 403 directs the object light that has arrived via the photographic lens apparatus 402 to an image sensor 404 and a screen 405. The half mirror 403 pops up and is stored during exposure by a release operation, so that the object light can be transmitted to the image sensor 404 without passing through unnecessary parts of the optical system, such as the half mirror. An in-finder display device 408, which is a transmissive display device, can superimpose the displayed information on an image of the object displayed on the screen 405.

The object image displayed on the screen 405 and the in-finder display device 408 can be transmitted to the photographer via a pentagonal prism 406 and an eyepiece lens 407. A display device 409 corresponds to the output device 105 illustrated in FIG. 1. Each component included in the imaging apparatus illustrated in FIG. 4 is controlled by the CPU 101 illustrated in FIG. 1. Further, the imaging apparatus includes storage devices such as the ROM 102 and RAM 103, the various operation buttons of the input device 104, and the memory card 108, which are not illustrated in FIG. 4.

Operations of the present exemplary embodiment using the above imaging apparatus configuration will be described. First, shooting support information presentation processing characteristic to the present exemplary embodiment, will be described based on the flowchart in FIG. 2, and FIGS. 1 and 4.

Figure 2:
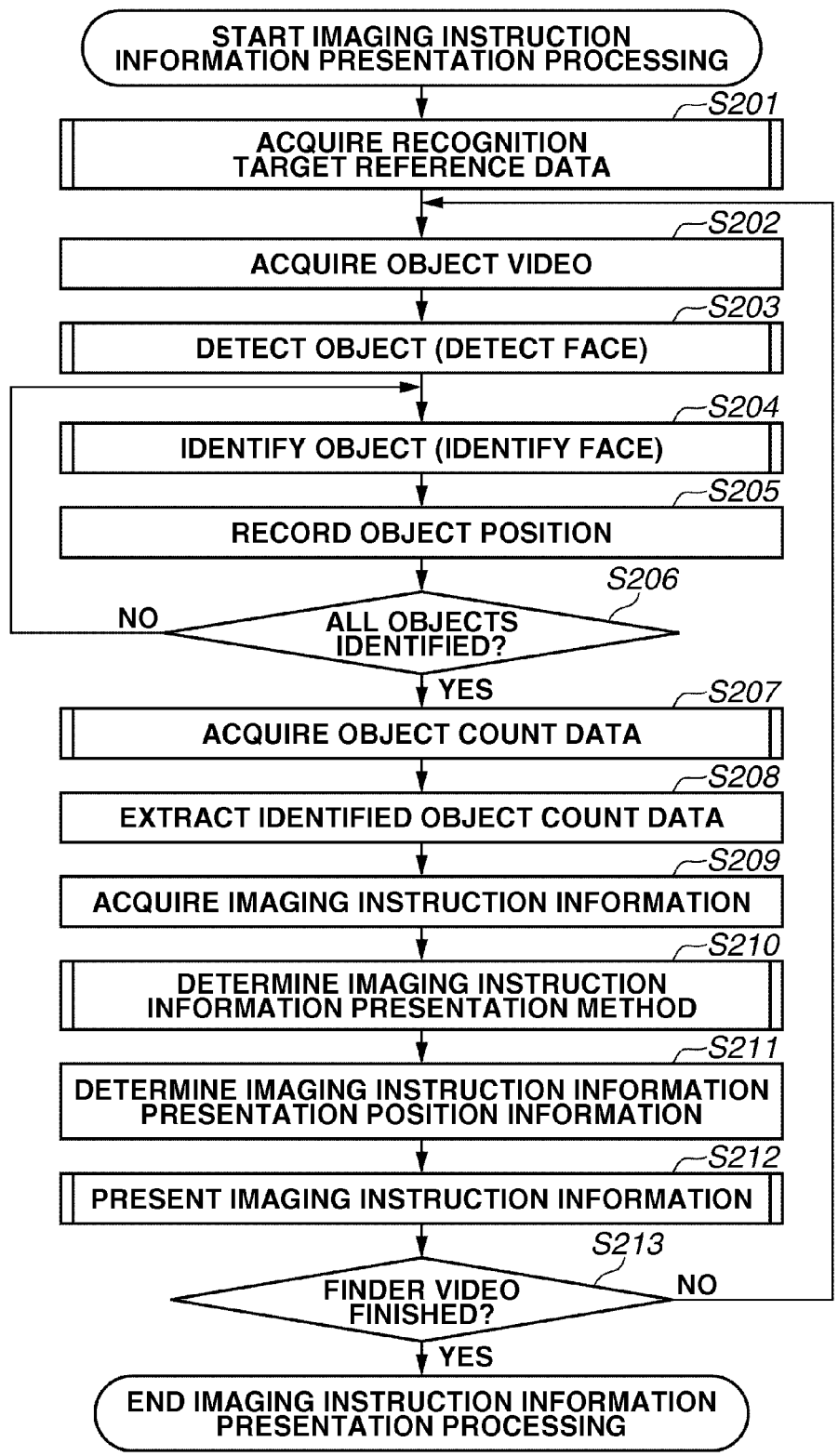
FIG. 2 is a flowchart illustrating shooting support information presentation processing according to the first exemplary embodiment.

In step S201 in FIG. 2, to perform individual identification of the object by the imaging apparatus accurately and efficiently, face image reference data is acquired for the object that will serve as identification targets. As the reference data, it is preferred to use image data shot at an event reception or the like where the shooting is performed using the subject imaging apparatus, because less time has elapsed for the object. Obviously, the reference data may also be acquired in advance. Further, when acquiring the face image, better and more accurate individual identification can be performed by using images acquired not only from the front but from all directions as the reference data.

As an example of the specific processing performed in step S201, the CPU 101 detects face regions from image data acquired by imaging processing or from the memory card 108. The CPU 101 extracts the detected face regions, and stores the image data as the reference data in the storage device such as the RAM 103 or the memory card 108. Feature information calculated from the face region images in each object may also be used for the reference data. Further, a reference database may be built in the RAM 103 by registering an identification code, such as the name of the object, corresponding to each of the objects as identification targets associated with the reference data.

In step S202, the imaging apparatus acquires the object image. The imaging apparatus acquires the object image using the image sensor 404 to receive object light before the release operation which is transmitted through the photographic lens apparatus 402 and the half mirror 403. The photographer can confirm the object image similar to that of the image sensor 404 based on a finder image similarly projected and displayed on the screen 405. Acquisition of the object image in step S202 in the shooting support information presentation processing is executed when the CPU 101 detects a half-pressed state of the shutter button, which is a shooting preparation operation switch. This is to reduce the load on the CPU 101 by executing the subsequent processing only when the photographer intends to shoot an image.

Next, in step S203, the CPU 101 analyzes the object image acquired in step S202, and detects the object faces. Further, the CPU 101 also acquires the size of the face regions based on analysis of the object image. Currently, various face detection techniques have been developed and implemented in digital camera apparatuses. For example, high-speed detection of a plurality of faces and functions such as automatic focus and automatic exposure based on face detection have been developed. Therefore, a detailed description of the face detection function is omitted here.

In step S204, the CPU 101 identifies each face detected in step S203 based on the reference data acquired in step S201.

Regarding the face identification function, various techniques have been also developed and implemented in digital camera apparatuses based on facial feature point data. For objects under suitable conditions, face identification has a high identification accuracy, and is highly practical. Therefore, a detailed description of the face identification function is omitted here.

The CPU 101 identifies which of the objects registered in step S201 each of the detected faces is from. In this step, the CPU 101 also determines whether the object detected in step S203 is registered as the reference data. If it is determined that the detected object is not registered, a flag is set on the RAM 103 indicating that the object is not a registered person, and the subsequent processing is not performed on that object. This configuration enables shooting support information to be presented only for the registered objects, so that the photographer can perform shooting that focuses on the registered persons.

If a non-registered person object is captured as the object image, the object can be newly registered as an identification target based on an operation performed by the photographer using the input device 104. In this case, if the CPU 101 detects an input from the input device 104, the CPU 101 executes the reference data acquisition processing illustrated in step S201. Then, the CPU 101 registers the detected face region as the reference data. With this configuration, an imaging instruction can be issued in the same manner even for an object whose participation in the event was late.

Next, in step S205, the CPU 101 analyzes a position in the whole object image where the face of each object identified in step S204 is detected. Then, the CPU 101 stores position information, which is the analysis result, in the storage device such as the RAM 103, and acquires the position information.

In step S206, the CPU 101 determines whether the processing from steps S204 to S205 has been performed on all of the faces of the objects detected in step S203. The determination in step S206 is repeated until the processing is finished for all faces. If it is determined that the processing has not been performed on all faces (NO in step S206), the processing returns to step S204, and the CPU 101 identifies the object of the next detected face. On the other hand, if it is determined that the processing has been completed for all faces (YES in step S206), the processing proceeds to step S207.

In step S207, the CPU 101 acquires object count data. The "object count data" is a count result of pieces of composition information based on the number of people appearing and position information about each object in one image in the image data serving as the count target stored in the memory card 108 or the like. More specifically, the object count data includes information that reflects how many pieces of image data each object appears in (number of image data appearances) in the image data serving as the count target stored in the storage device. Further, the object count data reflects position information and information relating to the number of people appearing in other objects in one image for each image data in which an object appeared.

An object count data acquisition sub-routine will be described in detail below using the flowchart in FIG. 11. In step S1101, the CPU 101 reads image data which is shot in the past and stored in the memory card 108, and rasterizes the read data on the RAM 103. The image data to be read and used as the count target can be arbitrary controlled based on the shot date and time, for example.

The photographer can set restrictions on the image data serving as the count target by operating the output device. Further, the image data to be read is not limited to image data shot by the subject apparatus. Information relating to the image data serving as the count target is stored as an image ID in below-described object count data. Based on the configuration which restricts the image data serving as the count target, the count data can be created with suitable divisions, such as on a per-event basis, if the image data shot in the past remains in the memory card 108.

Next, in step S1102, the CPU 101 detects object faces in one image represented by the image data read in step S1101 to detect the number of people appearing in the image.

In step S1103, the CPU 101 analyzes the image data based on the faces detected in step S1102. More specifically, the CPU 101 analyzes the number of objects detected in step S1102, the size of the face region of each object, and the position of the face region of each object. Further, the CPU 101 may also detect the direction, expression and the like of the face of each object. In addition to the face detection, the CPU 101 can also perform physical shape recognition of the object in order to analyze the composition of the image data. For example, the CPU 101 can analyze the imaging environment, such as whether the image is of a group photograph or is shown with a background.

Next, in step S1104, the CPU 101 identifies the objects detected in step S1102 based on the reference data acquired in step S201. If an object that is not a registered identification target is detected, a flag indicating that the object is not the registered person is set, and the below-described processing is not performed.

In step S1105, the CPU 101 writes and updates the count data for each object. The count data is created in the storage device, such as the RAM 103.

An example of the object count data is illustrated in FIG. 12A. An identification code 1201 is acquired along with the reference data. An image ID 1202 is information relating to the image data serving as the count target that is stored in the memory card 108. The image ID 1202 corresponds to a file name or the like of the image data. Information 1203 indicates how many objects are detected in one image, and is thus the number of objects appearing in that image (object number). Further, in addition to the number of people, the information 1203 may also store an identification code for another appearance object in the image.

Information 1204 indicates position information in the image for each object. For example, the information 1204 may store the coordinates of the center position of the face region in the image. Information 1205 indicates the size of the face region in the image for each object. For example, the information 1205 may store the pixel number in the horizontal and longitudinal directions of the face region. In addition, the information 1205 may also store information about the expression and direction of the face. FIG. 12B is an image information table illustrating the imaging environment of the image data analyzed in step S1103. The image information is stored together with the object count data.

Thus, when the image is analyzed, composition information about which image, what position, what size, who with, and under what environment, and information about the number of appearances are written in the count object data for each object. More specifically, the number of image data pieces that an object appears in among the image data serving as the count target can be determined by referring to the object count data.

Returning to FIG. 11, next, in step S1106, the CPU 101 determines whether the analysis of all the image data pieces serving as the count target has finished. If the analysis has not finished (NO in step S1106), the processing returns to step S1101, and the CPU 101 reads the next image data.

If it is determined that the analysis has finished for all the image data pieces (YES in step S1106), the processing proceeds to step S1107. In step S1107, the CPU 101 rasterizes the created object count data, which is the count result, on the RAM 103, and acquires the rasterized object count data. Then, the object count data acquisition sub-routine is finished. Thus, the object count data such as the number of image data appearances for each object and position information for each image data that the object appears in can be acquired by analyzing the image data stored in the storage device.

Returning to FIG. 2, in step S208, the CPU 101 checks each object detected and identified in steps S204 and S205 against the count data acquired in step S207. Then, the CPU 101 extracts the results of the object count data corresponding to each identified object. More specifically, composition information about the position information in the image data and information about how many imaging results are present (number of image data appearances) in the image data stored in the storage device are acquired for each identified object.

In step S209, the CPU 101 derives a composition instruction point, which is information to be used in an imaging instruction, for each object based on the object count data for each object acquired in step S208 and a point table stored in the ROM 102.

FIGS. 6A to 6D illustrate an example of a point table based on the composition information and an example of calculation of shooting support information. FIG. 6A is an example of the point table based on the composition information that is used in the calculation performed in step S209. Information 609 indicates the object number, which is the number of people appearing in the image. Information 610 indicates the imaging position in the image based on the object. Information 611 indicates the points that are assigned to each object based on the object number and the imaging position.

FIG. 6B is an example of the image data for illustrating the imaging position in the image indicated by the information 610 in FIG. 6A. A whole image 601 is represented by the image data, and object 602, 603, and 604 indicate three persons present in the whole image. Virtual assistance lines 605 divide the whole image represented by the image data into three. In actuality, the virtual assistance line 605 is not present on the whole image. More specifically, the whole image 601 is identified as a region 607 in the center position and regions 606 and 608 which are positions at both ends. The center position and both end positions indicated by the information 610 in FIG. 6A are associated with the region 607 at the center position and the regions 606 and 608 at either end position in FIG. 6B.

As an example, the point value of the object in FIG. 6B will be calculated. The CPU 101 analyzes the whole image 601 illustrated in FIG. 6B, and detects three objects. Then, the object 603 in the center position is given four points from the point table based on the composition information of FIG. 6A. Further, the objects 604 and 602, which are positions at either end, are similarly given two points.

Thus, in step S209, the CPU 101 refers to the object count data acquired in step S207 for each object that is acquired by the imaging device 106 and identified in the object image. Then, the CPU 101 derives a point value as information to be used for the shooting support information according to the point table based on the composition information in FIG. 6A from the object count data for each object. Further, these points are counted based on the number of image data appearances in each image data.

Then, in step S210, the CPU 101 determines the method for presenting the information to be used in the imaging instruction acquired in step S209 for each object face identified in the object image acquired by the imaging device 106.

FIG. 7A illustrates an example of determining the method for presenting the information to be used in the imaging instruction corresponding to the composition instruction points obtained by counting the number of image data appearances in step S209. Based on the number of counted composition instruction points 701, the corresponding presentation method is determined. The number of the counted composition instruction points 701 for determining the presentation method can be appropriately changed based on the number of images serving as the object count data in the memory card 108 and the number of people registered as the reference data. Further, the presentation method can also be changed based on the relative difference in the number of the composition instruction points of each object in the object image acquired by the imaging device 106.

FIGS. 7B, 7C, and 7D illustrate an example of specific presentation methods, corresponding to the three types of presentation method 702. An item 703 in FIG. 7B indicates a highlighted display. An item 704 in FIG. 7C indicates a normal display. An item 705 in FIG. 7D indicates a weak display. Each of these items is shaped like a speech balloon. In the speech balloons, information about the name corresponding to the face of the identified object and the number of the composition instruction points may be displayed. Further, the display of the frame portions of the speech balloons is presented differently. The method for presenting the shooting support information can thus be changed. Consequently, the photographer can determine at a glance which objects do not have enough number of images and which objects should be further photographed in the center position.

Next, in step S211, the CPU 101 determines which position in the object image to arrange the speech balloon shaped information presentations illustrated by FIGS. 7B, 7C, and 7D determined in step S210. For example, the CPU 101 refers to the position and the size of the face region in each object that are the analysis results obtained based on positional analysis that is acquired during the analysis of the object image and the face detection performed in step S203. Then, based on the analysis results, the CPU 101 determines the size and the arrangement position of the speech balloon so as not to overlap the face of the object. Thus, since the display is controlled based on the analysis results of the object image so that the shooting support information is suitably arranged, the photographer can perform shooting with an appropriate composition if the shooting support information is displayed on the finder image.

In step S212, the CPU 101 performs control to display the shooting support information for each object in the object image at the arrangement position thereof determined in step S211. The CPU 101 performs the control so that the shape of the speech balloon corresponding to the counted composition instruction points is displayed for each object on the in-finder display device 408 with the name information and the number of the composition instruction points.

Figure 5:
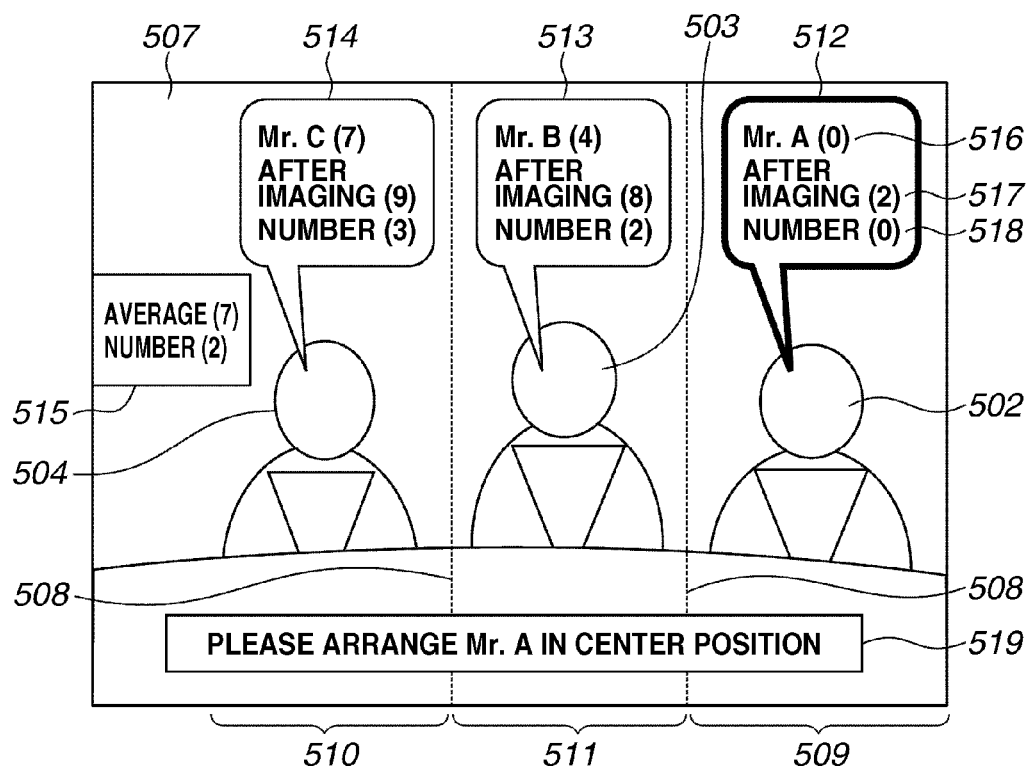
FIG. 5 illustrates an example of shooting support information presentation according to each exemplary embodiment.

FIG. 5 illustrates a finder image for presenting the photographer with the shooting support information when an object image is acquired by the imaging device 106 in the imaging apparatus according to the present exemplary embodiment. In FIG. 5, a finder image 507 captured by the imaging apparatus includes three objects 502, 503, and 504. At this stage, in the imaging apparatus, the finder image 507 and an equivalent image are transmitted through the half mirror 403 and are also captured by the image sensor 404.

Then, the faces of the three objects are identified by repeating the processing in steps S203 to S206. Further, based on the processing in steps S207 to S211, the number of image data appearances in the image data stored in the memory card 108, specifically, what position in the image and the number of shot images for each of the identified three objects are counted. Simultaneously, the type of speech balloon frame corresponding to each object, the name displayed in the speech balloon, and the number of the composition instruction points are acquired.

In step S212, based on the acquired number of the composition instruction points, information pieces 512, 513, and 514 are displayed in the in-finder display device 408 of the imaging apparatus, so that the image on the in-finder display device 408 is superimposed on the screen 405 on which the object image is projected. Consequently, the image illustrated in FIG. 5 is presented to the photographer via the finder 109 in the imaging apparatus. In the shooting support information pieces 512, 513, and 514, the name and the number of the composition instruction points acquired from information 516 are respectively displayed. Information 517 indicates the after-imaging points when the imaging processing is performed using the current composition based on the position information acquired by analyzing the position in step S205. Further, information 518 indicates the number of images shot up till now, more specifically, the appearance number (number of image data appearances) in the image data serving as the count target.

The above information is displayed on the in-finder display device 408 for each object. Further, information 515 displays the average composition instruction point value and the average number of shot images of the identification target objects. Thus, the photographer can easily determine the composition that should be used to shoot each object by referring to the point values based on the presented shooting support information superimposed on the object image.

Further, since the shooting support information is presented that also includes composition information in addition to the number of shot images of the object, imaging can be performed that has little bias in terms of composition or number of images. In addition, based on the image data shot up till now, imaging can be performed that has little bias in the number of shot images for each object by displaying the shooting support information that can be easily understood as to what kind of shooting is required for each object.

Subsequently, in step S213, the CPU 101 determines whether presentation of the shooting support information to the photographer has finished. More specifically, the CPU 101 finishes presentation of the shooting support information when it detects that the half-pressed state of the input device 104 has finished. In other words, when the photographer ends the half-pressed state of the shutter button or when the CPU 101 detects an imaging processing start signal produced when the shutter button is fully pressed, the CPU 101 finishes presentation of the shooting support information.

In the present exemplary embodiment, although the shooting support information is presented when the half-pressed state of the shutter button is detected, the present invention is not limited to this configuration. For example, in a live view mode that uses the liquid crystal panel as the finder without using an optical finder, the shooting support information may be presented as needed when an object is detected and identified.

Regarding the determination of the presentation of the shooting support information performed in step S213, the presentation of the shooting support information is finished based on an input into the input device 104 by the photographer to cancel the presentation of the shooting support information. Obviously, if it is determined that the viewing angle or the imaging apparatus position is changed and a new object image is acquired, the processing returns to step S202, and the CPU 101 repeats the shooting support information presentation processing in the imaging apparatus.

As described above, according to the present exemplary embodiment, when the photographer shoots participants in an event, by referring to the composition instruction points which are the shooting support information presented for each object, participants for which there are few shot images can be identified. Further, since the composition information is also added, participants who were shot in many images but are only shown on the edges of the imaging data can also be identified. Therefore, shooting having a well-balanced composition can be performed.

Further, according to the present exemplary embodiment, the shooting support information includes point values based on the composition information for each object in the image data stored in the storage device. Therefore, if the photographer performs shooting to equalize the composition instruction points of all the objects by referring to the composition instruction points, shooting having a good balance between the number of shot images and the composition can be easily performed without even thinking about it.

Further, when the shooting support information is presented, since the presentation method is changed based on the composition instruction points, shooting can be determined for each object at a glance without having to focus on the composition instruction point value. Therefore, information that can be easily used by the photographer can be presented.

Further, since each piece of shooting support information is presented for each object in the object image acquired by the imaging unit, the photographer can determine the composition while performing the object image confirmation operations that are normally carried out. Consequently, no special operations are required, and thus the imaging apparatus is convenient.

In the present exemplary embodiment, as illustrated in FIGS. 6A to 6D, the acquired object image is divided into regions based on the number of detected objects, and each region is associated with a composition instruction point value. However, the present invention is not limited to this mode. For example, the composition instruction point value association may be changed based on the size of the face detected in step S203 in the shooting support information presentation processing illustrated in FIG. 2.

For example, it is difficult to say a composition based on distance from the imaging apparatus for each object is reflected just by dividing into regions as illustrated in FIG. 6D. Therefore, based on the correspondence table illustrated in FIG. 6C, points corresponding to the size of the detected faces may be derived and counted. Further, the composition instruction point value association may combine region division and face size.

Further, the composition instruction points of objects closer to the in-focus position may be increased. In addition, the points may be changed based on expression of the object. Thus, a plurality of point tables for deriving points based on the situation may be stored in the storage device such as the ROM 102, so that the CPU 101 can calculate the points using the point table based on the situation.

In addition, the points can be changed based on the imaging environment. This is because, for example, for an imaging environment in which a group will be included, such as for a group photograph, it is not appropriate to set different point values. More specifically, association of the point and the composition information, such as the detected object regions, can be changed according to the imaging target and the situation. In this case, the CPU 101 refers to the image information illustrated in FIG. 12B, and calculates the points using a point table that is suited to that imaging environment.

Moreover, regarding an object that is a specific imaging target, for example an object who is a guest of honor, the points may be derived and calculated to obtain a lower value by multiplying by a constant. In this case, the guest of honor can be set by an operation from the input device 104. Further, guest of honor information indicating that the object is the guest of honor may be added to the reference data of the object set as the guest of honor. When deriving the composition instruction points as described in step S209, the CPU 101 multiplies the points of the object set as the guest of honor by the constant based on the guest of honor information. Thus, by providing a guest of honor setting unit, an instruction can be issued so that more images of the object set as the guest of honor are intentionally shot.

In the present exemplary embodiment, although the shooting support information is displayed using the finder 109, the shooting support information can also be displayed by a display unit, such as a liquid crystal panel, shown by the output device 105 as in a live view mode.

Although a speech balloon is described as an example of the presentation method, any presentation method may be used, as long as the photographer can identify differences in the composition instruction points at a glance. For example, for an object for which it is determined that further shooting is required, the detected face region may be enclosed by a red frame on the in-finder display device 408. Further, for an object determined to have a sufficient number of shot images, the detected face region may be enclosed by a dotted-line frame on the in-finder display device 408.

To support the appropriate composition, it is preferred to also display information instructing the composition that should be used to shoot an object as the shooting support information. For example, when an object A that does not have enough shot images in the center position is captured as the object image, a message such as "please shoot Mr. or Ms. A in the center position" may be displayed on the in-finder display device 408. A message 519 in FIG. 5 is an example of a composition instruction information presentation.

The CPU 101 determines the object for which the composition instruction should be issued based on the composition instruction points and the number of shot images of the objects captured in the object image. Based on the composition instruction points and the number of shot images of the determined object, the CPU 101 presents the composition instruction information 519 on the in-finder display device. Thus, by presenting the composition instruction information, shooting in various compositions for each object can be supported in order to create an album that has a good composition balance.

Further, according to the present exemplary embodiment, although the shooting support information is presented using speech balloons for all of the identified objects, if the condition of the objects is not suitable for images to be used in an album, the information presentation may itself be stopped.

Figure 10:
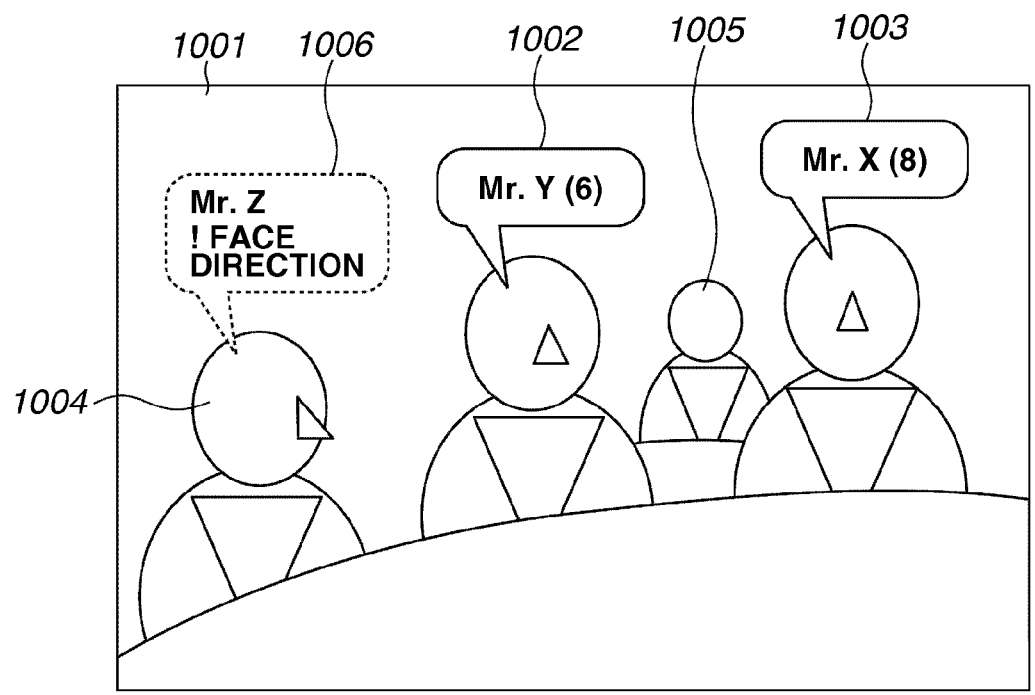
FIG. 10 illustrates a presentation example of shooting support information according to each exemplary embodiment when an object state is not suitable.

FIG. 10 illustrates a case when the condition of the objects is not suitable. In FIG. 10, an object image 1001 is acquired by the imaging apparatus, and shooting support information pieces 1002 and 1003 are indicated for objects that have been identified by the imaging apparatus.

At this stage, although the face detection is performed on an object 1005 as described in step S203 of FIG. 2, the size of the detected face region is smaller than a prescribed size. Consequently, the CPU 101 determines that the object 1005 is not suitable as an object. Therefore, the CPU 101 controls so that a shooting support information speech balloon is not presented for the object 1005. Similarly, although the face detection is performed on an object 1004, the direction of the detected face is beyond a prescribed angle. Consequently, the CPU 101 determines that the object 1004 is not suitable as an object. Configuring the imaging apparatus in this manner enables the photographer to perform shooting while concentrating only on the shooting support information speech balloons.

Further, special shooting support information indicating why an object is not suitable may also be presented for objects thus determined not to be suitable. For example, in the situation described above, the shooting support information shown in a speech balloon 1006 indicates that the object 1004 is not suitable because the direction of the detected face is beyond the prescribed angle. Further, the CPU 101 may create the shooting support information instructing how to change the composition so that the object will be suitable, such as "zoom" or "move to the front", based on the image analysis performed in step S203. Configuring the imaging apparatus in this manner allows imaging instructions to be issued to the photographer so that a photograph suitable for an album will be obtained for all of the objects. Accordingly, editing operations, such as selection of the photographs to be used in the album, become easier.

Although an image ID for the object count data is used as the information defining the image data which serves as the count target, the present invention is not limited to this configuration. For example, during the object count data acquisition processing, the address of the folder storing the read image data may be stored in the RAM 103.

In the first exemplary embodiment, when an object image is captured and the registered object is identified by the imaging apparatus, based on the image data in the storage device, the shooting support information is presented to act as an instruction regarding further shooting is required and the compositional arrangement of the object. Further, in the object count data acquisition processing illustrated by the flowchart in FIG. 11, the number of shot images and the composition information for each object are acquired by analyzing each piece of the image data stored in the storage device.

In a second exemplary embodiment, the name of an identified object and the composition information in acquired image data are added as metadata to image data acquired when an imaging operation is performed by the imaging apparatus according to the present exemplary embodiment. The imaging processing operation according to the present exemplary embodiment will be described based on the flowchart illustrated in FIG. 3.

The imaging processing is started by an interrupt operation during execution of the shooting support information presentation processing illustrated in FIG. 2 when an operation is performed that instructs shooting, such as an input by the photographer from the shutter button included in the input device 104.

Figure 3:
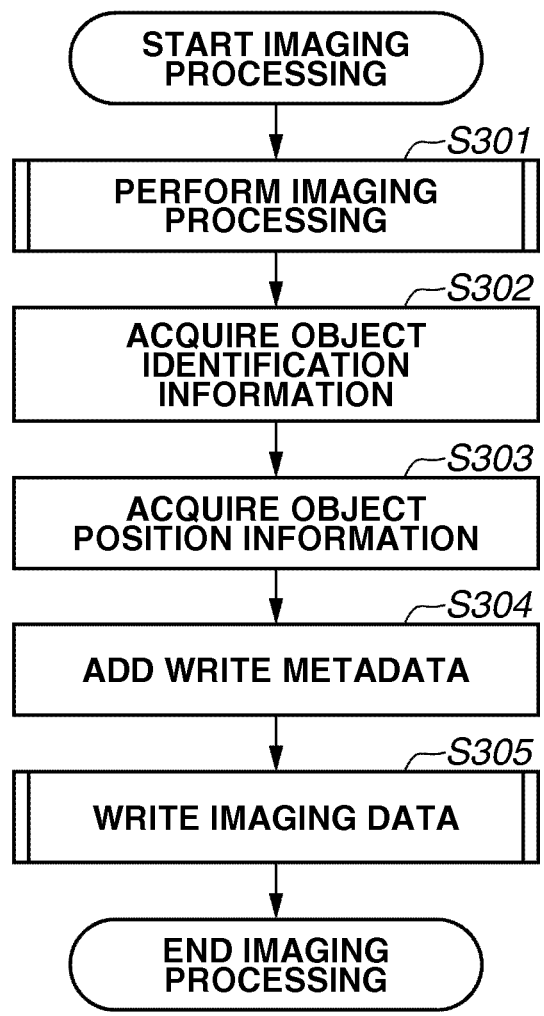
FIG. 3 is a flowchart illustrating imaging processing according to a second exemplary embodiment.

In step S301 in FIG. 3, the imaging apparatus performs imaging processing. The processing performed in step S202 is executed before writing the shot image data into the storage device, such as the memory card 108.

In step S302, the CPU 101 acquires information about the objects identified in step S204 of the flowchart illustrated in FIG. 2 immediately before the imaging processing is started. In step S303, the CPU 101 acquires the position information about the objects which is obtained by the position analysis in step S3205 in FIG. 2 and stored in the RAM 103.

In step S304, the CPU 101 adds the information acquired in steps S302 and S303, more specifically, the name of the identified objects and the composition information of the acquired image data, as accompanying metadata to the acquired image data. In step S305, the CPU 101 controls the I/O device 107 to write the image data into the memory card 108 together with the metadata added in step S304.

As described above, in the second exemplary embodiment, the names of the identified objects and the composition information of the acquired image data are added as metadata to each image data of the shot image. Therefore, in the object count data acquisition processing illustrated in FIG. 11, if the metadata is also acquired during reading the image data in step S1101, the processing performed in the subsequent steps S1102 to S1104 can be omitted.

Further, since metadata is added to the image data, an external device such as a personal computer (PC) can easily perform an editing operation based on the names of the identified objects and the composition information. For example, even when an album is created using such imaging data, it is easy to select and extract the shot image data in which consideration is given to the equality of the appearance frequency of each object. Further, when an album is created including a specific object, the selection from the shot image data is obviously easier.

In the first exemplary embodiment, although the counting of the composition instruction points is performed each time the shooting support information presentation processing illustrated in FIG. 2 is performed, this processing may also be performed during the imaging processing.

Figure 8:
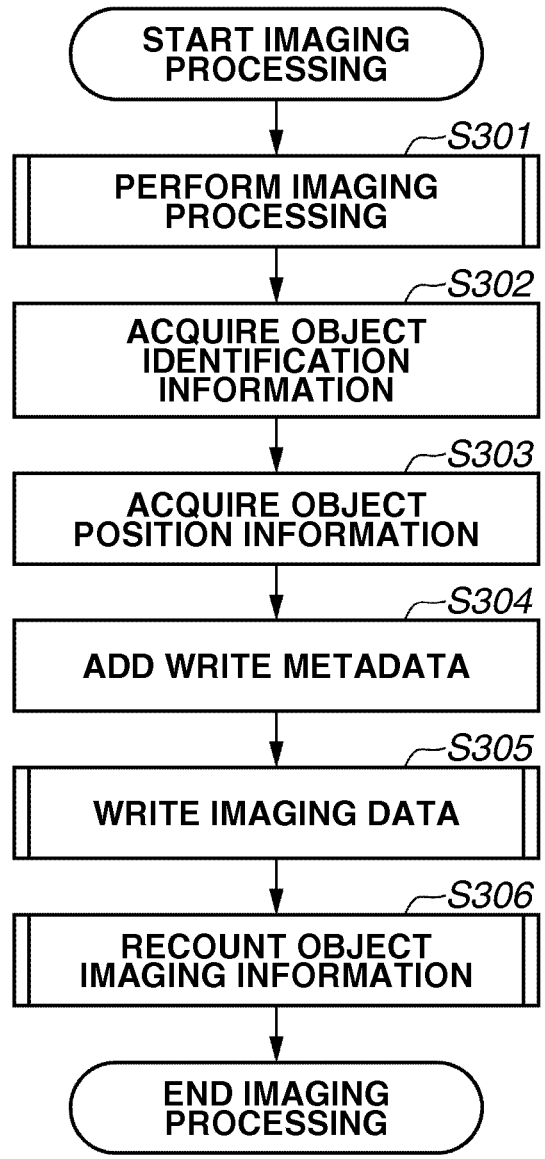
FIG. 8 is a flowchart illustrating a configuration for recounting object imaging information during the imaging processing according to the second exemplary embodiment.

FIG. 8 is a flowchart illustrating imaging processing in which recounting of the object imaging information is performed. After the imaging data is written in step S305, in step S306, the CPU 101 recounts the object imaging information. The CPU 101 recounts the object imaging information by successively adding information about the image data shot by the present processing to the object count data illustrated in FIG. 12 that is stored in the RAM 103 in advance.

More specifically, in the present exemplary embodiment, the object count data acquisition processing in step S207 in the shooting support information presentation processing illustrated in FIG. 2 can be performed by the CPU 101 referring to the object count data stored in the RAM 103. Consequently, the processing load of the shooting support information presentation processing can be reduced.

A third exemplary embodiment will now be described. In the first and second exemplary embodiments, although facial recognition is used to identify the objects, the objects may be identified using another method. For example, at a wedding reception venue, seating is usually determined based on a seating order list. Thus, the objects shot by the imaging apparatus can be specified by specifying the position and the direction of the imaging apparatus in the venue.

Figure 9A:
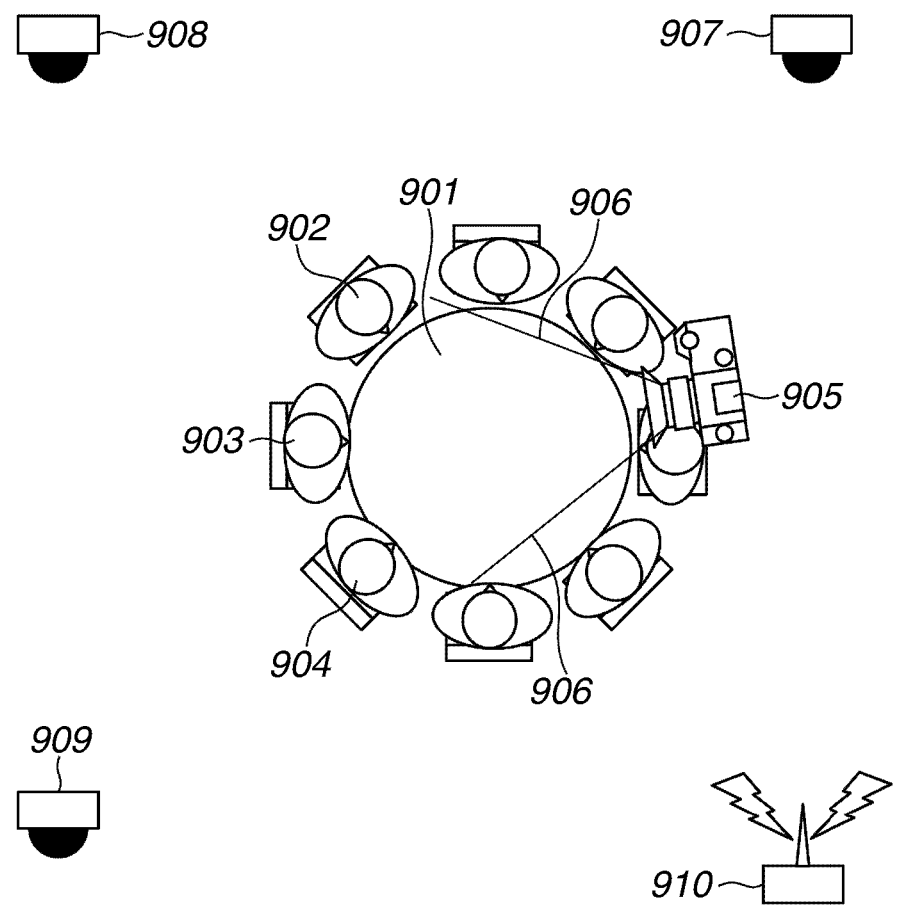
FIGS. 9A and 9B illustrate a shooting assistance system according to a third exemplary embodiment.
Figure 9B:
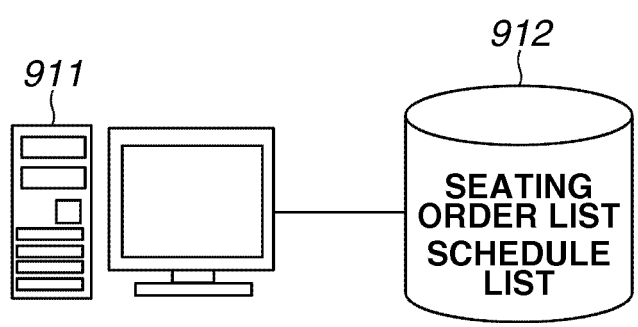

FIGS. 9A and 9B are schematic diagrams of a shooting assistance system in a venue that includes an imaging apparatus for realizing the above effect. In FIG. 9A, a table 901 in the venue is surrounded by eight chairs. Objects 902, 903, and 904 are sitting around the table. An imaging apparatus 905 includes a position detection source unit that emits infrared light on its upper portion. Further, the imaging apparatus 905 includes an orientation detection unit, such as an orientation sensor. The imaging apparatus 905 also includes a wireless local area network (LAN) communication unit, which enables the imaging apparatus 905 to transmit and receive data to/from a below-described computer 911 via a wireless device 910.

Lines 906 schematically illustrate a shooting range of the imaging apparatus 905. The shooting range changes based on an angle of view which is an imaging condition set by the imaging apparatus. Optical sensors 907, 908, and 909 are arranged at predetermined positions on the venue ceiling. These optical sensors detect the infrared light emitted from the upper portion of the imaging apparatus 905, so that the position of the imaging apparatus can be specified by calculating information such as the received angle.

The wireless device 910 communicates with the optical sensors 907 to 909 and the computer 911 to exchange various information pieces. The imaging apparatus 905 transmits information from the orientation sensor for detecting a direction to the computer 911. Further, the optical sensors 907 to 909 transmit information about the received angle of the infrared light to the computer 911.

The computer 911 includes a calculation device, such as a CPU, and acquires object position information from the seating order list data. Further, the computer 911 is also an information processing apparatus including an identification unit for identifying objects based on the position and direction information about the imaging apparatus and object position information acquisition. In FIG. 9B, a database 912 include a seating order list (object position information) that acts as a correspondence table between the position of the seats in the venue and the name of object candidates seated in those seats. The database 912 may also include a schedule list database for acquiring time slots when a specific object candidate may be out of his/her seat due to party entertainment, for example.

As an operation performed by the thus-configured shooting assistance system, information from the orientation sensor and information about the angle of view are transmitted together with the object image captured by the imaging apparatus to the computer 911 via the wireless device 910. Further, the optical sensors 907 to 909 transmit the information about the received angle of the infrared light to the computer 911 via the wireless device 910. In the computer 911, the position, the direction, and the shooting range of the imaging apparatus are specified based on the received data. Next, the computer 911 acquires object position information from the seating order list data.

The computer 911 identifies the objects captured by the imaging apparatus based on the specified position, direction, and shooting range of the imaging apparatus, and the object position information acquisition. Then, the computer 911 transmits information about the identified objects associated with the positions in the object image to the imaging apparatus via the wireless device 910. Based on the received information, the imaging apparatus identifies the objects. Then, the imaging apparatus presents the shooting support information for each object. Apart from the method for identifying the objects, since the configuration of the present exemplary embodiment is similar to that in the first exemplary embodiment, a detailed description thereof is omitted here.

As described above, in the present exemplary embodiment, the objects are identified based on the shooting range and the object information position acquisition. According to this configuration, the imaging apparatus can identify the objects in the object image without storing information for identifying the objects.

In the third exemplary embodiment, regarding the object identification method, a server acting as an information processing apparatus collates with the seating order list data and calculate object identification information based on the position and the direction of the imaging apparatus, and transmits the object identification information to the imaging apparatus. In a fourth exemplary embodiment, regarding the object identification method, object images acquired by an imaging apparatus are successively transmitted to a computer apparatus that acts as a server, and the objects are identified on the server.

FIG. 13 is a block diagram illustrating a shooting assistance system according to the fourth exemplary embodiment. In FIG. 13, components that are similar to those illustrated in FIG. 1 are denoted using the same reference numerals. An imaging apparatus 1301 include an imaging device 106 and a finder 109. An image data acquisition unit 1302 acquires image data from an A/D conversion unit that converts an imaging signal output from an image sensor included in the imaging device 106 into image data and outputs the image data. A data transmission unit 1303 transmits the image data acquired by the image data acquisition unit 1302 to a server 1309 described below. A data reception unit 1304 receives various pieces of information from the server 1309.

The server 1309 is connected with the imaging apparatus 1301 via a network. The server 1309 includes a CPU serving as a calculation device. The server 1309 is an information processing apparatus that analyzes image data acquired from the imaging apparatus 1301, and transmits shooting support information to the imaging apparatus 1301. A face detection unit 1306 detects faces from the acquired image data. A face identification unit 1307 identifies the detected faces based on reference data stored in a storage device 1312 in advance.

Figure 11:
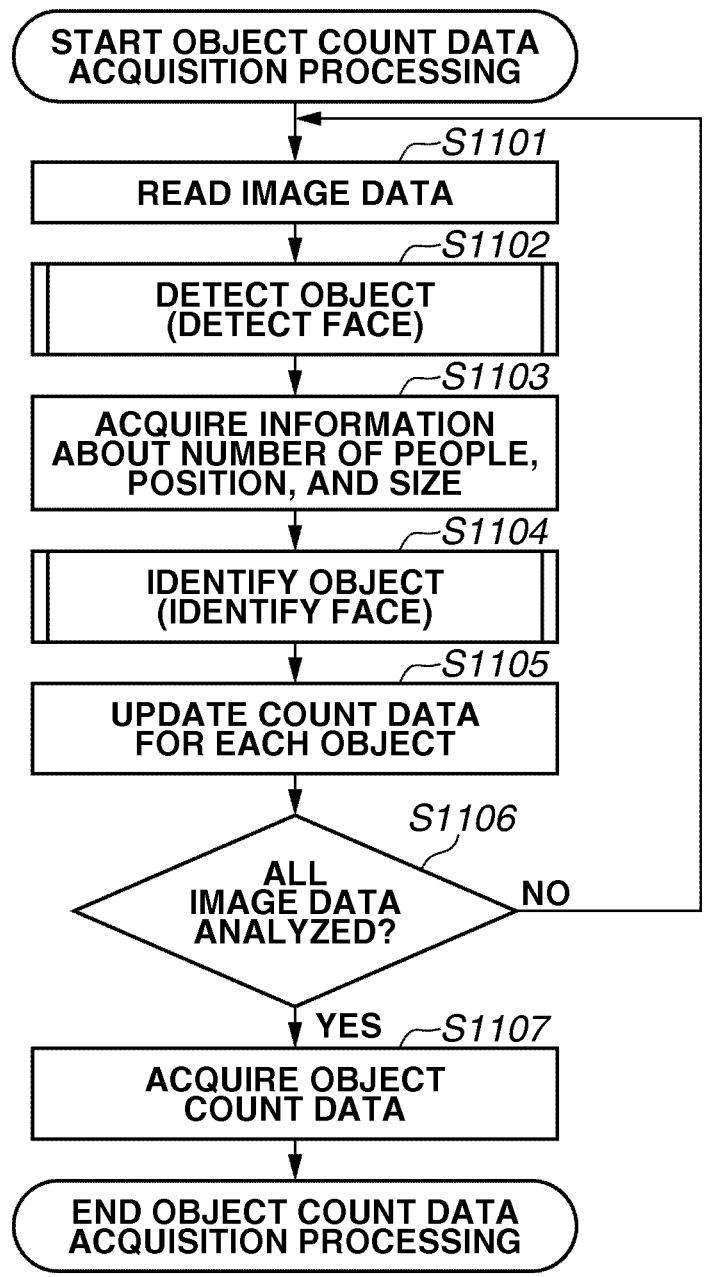
FIG. 11 is a flowchart illustrating object count data acquisition processing according to each exemplary embodiment.

An object count data acquisition unit 1308 performs the object count data acquisition processing illustrated in FIG. 11 based on the image data stored in the storage device 1312. A shooting support information creation unit 1310 creates shooting support information for each identified object based on the object count data. A data transmission unit 1311 transmits the created shooting support information to the imaging apparatus 1301. The storage device 1312 stores the reference data, the object count data, and the image data shot by the imaging apparatus 1301.

Shooting support information presentation will be described with reference to the above configuration. If the imaging apparatus 1301 detects an input of half-pressed of a shutter button, the imaging apparatus 1301 transmits the image data representing the object image acquired by the image data acquisition unit 1302 to the server 1309 via the data transmission unit 1303. Then, the server 1309 acquires the object image by the data reception unit 1305. Next, the server 1309 detects and identifies the faces in the object image using the face detection unit 1306 and the face identification unit 1307.

Based on the acquired object count data, the server 1309 transmits the shooting support information for each object identified by the shooting support information creation unit 1310 to the imaging apparatus 1301 via the data transmission unit 1311. The coordinate data used for presenting the shooting support information on the finder 109 in the imaging apparatus 1301 may also be transmitted at this time. Then, the imaging apparatus 1301 presents the acquired shooting support information on the finder 109 for each object based on the received coordinate data.

The image data shot by the imaging apparatus 1301 is transmitted to the server 1309 via the data transmission unit 1303. The server 1309 stores the received image data in the storage device 1312. The object count data acquisition unit 1308 analyzes the stored shot image data and performs a recount of the object count data.

By configuring in the above manner, since the acquisition of the object count data and the creation of the shooting support information are performed on the server, the load on the calculation processing function of the imaging apparatus can be reduced. Therefore, the calculation processing function of the imaging apparatus can be dedicated to image processing, so that the processing time taken in continuous shooting can be reduced. Further, by using a higher performance calculation processing function in the server, faster and more accurate recognition processing and shooting support information creation processing can be executed.

In the present exemplary embodiment, the shot image data is transmitted to the server, and the server manages the shot image data. In addition, the shooting support information is created using the image data managed by the server as a count target. More specifically, the image data shot by the imaging apparatus is added as a count target. Therefore, when shooting is performed with using a plurality of imaging apparatuses, the image data shot by an individual imaging apparatus can be added as the count target. Therefore, the object count data can be shared by the plurality of imaging apparatuses.

In this case, the image data shot by the respective plurality of imaging apparatuses is transmitted to the server 1309, and stored in the storage device 1312. Then, the shooting support information can be created by adding the image data shot by the plurality of imaging apparatuses as the count target. Therefore, the shooting support information that takes into account the imaging results from other imaging apparatuses can be transmitted to the individual imaging apparatuses. More specifically, the object count data can be shared among the imaging apparatuses.

In the above described exemplary embodiment, when shooting is performed while sharing the object count data using the plurality of imaging apparatuses, the image data managed by the computer apparatus acting as the server is used as a count target, and the shooting support information is transmitted to each imaging apparatus.

In a fifth exemplary embodiment, information is directly communicated among a plurality of imaging apparatuses. More specifically, the object information to be identified, such as reference data and object count data, is exchanged and shared among the imaging apparatuses.

An example will be described in which shooting is performed by three imaging apparatuses A, B, and C. It is assumed that the reference data acquisition processing illustrated in step S201 in FIG. 2 is newly performed by the imaging apparatus A, and the acquired reference data is registered as a new identification target. The imaging apparatus A transmits the registered reference data to the imaging apparatuses B and C. The imaging apparatuses B and C receive the reference data transmitted from the imaging apparatus A, and add the received reference data to their own reference database.

Further, when the imaging processing illustrated in FIG. 8 is performed by the imaging apparatus A, the object count data recounted in step S306 is similarly transmitted to the imaging apparatuses B and C. Then, based on the object count data similarly received by the imaging apparatuses B and C, the object count data is updated. The shot image data may also be directly transmitted to another imaging apparatus. By thus directly transmitting the image data, an image shot by another imaging apparatus can be easily confirmed. Therefore, the shooting of objects having a composition overlapping among photographers can be avoided, so that less wasteful shooting can be performed.

As described above, shooting of an event by a plurality of imaging apparatuses can be performed by configuring so that information is directly exchanged among the plurality of imaging apparatuses. Further, in each imaging apparatus, the shooting support information that reflects the imaging results of other imaging apparatuses can be presented.

When calculations such as in the recognition processing is performed, the load can be shared by or dispersed among the calculation devices of the plurality of imaging apparatus. Such configuration allows excess processing capability to be distributed, so that the processing can be performed more efficiently than for recognition processing performed by a single imaging apparatus.

In the above described exemplary embodiment, the object recognition, the position information about the imaging apparatus, and the position information about the seating data of the objects are used in the object identification. In a sixth exemplary embodiment, object identification is performed by providing the object with a wireless tag, and receiving information about the wireless tag in the imaging apparatus.

More specifically, information about the object name, which are the object ID, and other information are stored in the wireless tag of the object. Further, an element for changing directionality of an antenna beam, such as an electronic scanning antenna, is arranged on the front face of the imaging apparatus. The electronic scanning antenna detects the wireless tag of the object, and receives information from the wireless tag, so that the object can be identified. This configuration can dramatically improve the accuracy of object identification.

In the above exemplary embodiments, as the object identification method, the object identification is performed by specific identification means which uses the face identification based on image processing and the position information. In a seventh exemplary embodiment, object identification means will be described that combines face identification based on image processing and position information.

In the third exemplary embodiment, as the object identification method, identification is performed based on the position information about the imaging apparatus and the position information about the objects using seating order list data. In this case, identification may not be correctly performed, such as when an object moves his/her seat during the event.

In the present exemplary embodiment, during an initial period of the event, the object identification is performed based on the position information about the imaging apparatus and the object position information using seating order list data. Further, the image data about the objects identified based on the object position information is linked with the object information such as a name. More specifically, face images are acquired as reference data by performing shooting. Then, from a middle period and later of the event, the face identification of the objects is performed using the image data of the objects acquired by the shooting during the initial period of the event as the reference data.

With this configuration, since the reference data does not have to be acquired when people arrive at the event, the burden on the users (objects) can be reduced. Further, misidentifications can decrease if the objects move seats during the event. In addition, it can detect the misidentification when the identification is performed based on the position information, thus the misidentification can be corrected.

In each of the above described exemplary embodiments, the shooting support information is created by counting past imaging data. In an eighth exemplary embodiment, means is provided that can reset the count information relating to the imaging data at an arbitrary timing. A reset setting is made based on an input from the input device 104 of the imaging apparatus. In the shooting assistance system according to the fourth exemplary embodiment, a reset of the object count data may be set and executed based on an input from a mouse or keyboard (not illustrated) of the server. In addition, the image ID of the object count data, which is information relating to the image data serving as the count target, is deleted.

Such configuration allows objects to be shot with a good balance for each event composition. For example, in some cases there may be a plurality of events on the same day, such as a wedding, a reception, and an after-party. If the number of shot images for the wedding is large for some objects, the shooting support information may be indicated that the number of shot images is sufficient, so that these objects are not shot in the later events. However, by providing the reset means, an imaging instruction can be presented which enables the objects to be shot with little bias for each event.

In the above, various exemplary embodiments of the present invention are described in detail. However, the present invention may be embodied as, for example, a system, an apparatus, a method, a program, or a storage medium (storage device). Further, the present invention can be an embodiment in which its various functions are executed in a processor, such as an application-specific integrated circuit (ASIC). The present invention may be also applied in a system configured to include a plurality of devices (e.g., a host computer, an interface device, an imaging apparatus, a Web application etc.). In addition, the present invention may be applied in an apparatus configured from a single device.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-159008 filed Jul. 13, 2010, which is hereby incorporated by reference herein in its entirety.

What is claimed is:

1. An imaging apparatus for shooting images, the imaging apparatus comprising:
   an acquisition unit configured to acquire information about an evaluation of an identified individual in at least one shot image based on a composition of the image;
   a presentation unit configured to present the information corresponding to the identified individual, wherein the information is used to support shooting of the images;
   an identification unit configured to identify the individual in the at least one shot image;
   an imaging unit configured to capture an image of the identified individual; and
   an analysis unit configured to analyze a face region, of the identified individual, in the captured image,
   wherein the presentation unit is configured to present the information for each identified individual, and
   wherein the presentation unit is configured, based on an analysis result of the analysis unit, to present and display the captured image by superimposing the information thereon so as not to overlap the information with the face region of the identified individual in the captured image.

2. The imaging apparatus according to claim 1, further comprising a reset unit configured to reset the information acquired by the acquisition unit.

3. The imaging apparatus according to claim 1, further comprising:
   a communication unit,
   wherein the information is shared with an external apparatus via the communication unit.

4. The imaging apparatus according to claim 1,
   wherein the acquisition unit is configured to acquire a number of images previously shot of the identified individual, and
   wherein the presentation unit is further configured to present the number of images.

5. A method for controlling an imaging apparatus for shooting images, the method comprising:
   acquiring information about an evaluation of an identified individual in at least one shot image;
   presenting the information corresponding to the identified individual;
   identifying the individual in the at least one shot image;
   capturing an image of the identified individual; and
   analyzing a face region, of the identified individual, in the captured image,
   wherein presenting the information includes presenting the information for each identified individual, and
   wherein the captured image is presented and displayed, based on a result of analyzing the fact region, by superimposing the information thereon so as not to overlap the information with the face region of the identified individual in the captured image.

6. A non-transitory computer-readable storage medium storing a program for causing an imaging apparatus to execute the method according to claim 5.

7. An imaging apparatus for shooting images, the imaging apparatus comprising:
   an acquisition unit configured to acquire information about an evaluation of an identified individual in at least one shot image based on a composition of the image; and
   a presentation unit configured to present the information corresponding to the identified individual, wherein the information is used to support shooting of the images,
   wherein the presentation unit is configured to present the shooting support information as an evaluation value, and the presentation unit is configured to differentiate a presentation method of the shooting support information according to the evaluation value.

8. The imaging apparatus according to claim 7, further comprising a reset unit configured to reset the information acquired by the acquisition unit.

9. The imaging apparatus according to claim 7, further comprising:
   a communication unit,
   wherein the information is shared with an external apparatus via the communication unit.

10. The imaging apparatus according to claim 7,
    wherein the acquisition unit is configured to acquire a number of images previously shot of the identified individual, and
    wherein the presentation unit is further configured to present the number of images.

11. A method for controlling an imaging apparatus for shooting images, the method comprising:
    acquiring information about an evaluation of an identified individual in at least one shot image based on a composition of the image; and
    presenting the information corresponding to the identified individual, wherein the information is used to support shooting of the images,
    wherein presenting information includes presenting the shooting support information as an evaluation value and includes differentiating a presentation method of the shooting support information according to the evaluation value.

12. A non-transitory computer-readable storage medium storing a program for causing an imaging apparatus to execute the method according to claim 11.

13. An imaging apparatus for shooting images, the imaging apparatus comprising:
    an acquisition unit configured to acquire information about an evaluation of an identified individual in at least one shot image based on a composition of the image;
    a presentation unit configured to present the information corresponding to the identified individual, wherein the information is used to support shooting of the images;
    an identification unit configured to identify the individual in the at least one shot image;
    wherein the presentation unit is configured to present the information for each identified individual,
    and wherein the identification unit further comprises an addition unit configured to identify an individual in an image captured by the imaging unit and add information about the individual identified by the identification unit and a position of the individual in the captured image to the captured image.

14. The imaging apparatus according to claim 13, further comprising a reset unit configured to reset the information acquired by the acquisition unit.

15. The imaging apparatus according to claim 13, further comprising:
    a communication unit,
    wherein the information is shared with an external apparatus via the communication unit.

16. The imaging apparatus according to claim 13,
    wherein the acquisition unit is configured to acquire a number of images previously shot of the identified individual, and
    wherein the presentation unit is further configured to present the number of images.

17. A method for controlling imaging apparatus for shooting images, the method comprising:

acquiring information about an evaluation of an identified individual in at least one shot image based on a composition of the image;

presenting the information corresponding to the identified individual, wherein the information is used to support shooting of the images; and identifying the individual in the at least one shot image, wherein presenting the information includes presenting the information for each identified individual, and wherein identifying the individual includes identifying an individual in a captured image and adding information about the identified individual and a position of the individual in the captured image to the captured image.

18. A non-transitory computer-readable storage medium storing a program for causing an imaging apparatus to execute the method according to claim 17.

* * * * *